May 29, 1951     E. P. TURNER     2,555,165
PRECESSION RATE CONTROL FOR AUTOMATIC PILOTS
Filed May 29, 1946     2 Sheets-Sheet 2

Inventor
Edgar P. Turner

Witness:
N. Leszczak

By William P. Stewart
Attorney

Patented May 29, 1951

2,555,165

UNITED STATES PATENT OFFICE 2,555,165

PRECESSION RATE CONTROL FOR AUTOMATIC PILOTS

Edgar P. Turner, Fanwood, N. J., assignor to The Singer Manufacturing Company, Elizabeth, N. J., a corporation of New Jersey Application May 29, 1946, Serial No. 672,996

4 Claims. (Cl. 74—5.4)

This invention relates to automatic pilots employing maneuverable gyroscopes and more particularly to means for controlling the precession response of said gyroscopes to torques applied athwartwise of the spin-axis.

It is well known in the art of gyroscopics that the torque required to precess the spin-axis is proportional to the product of the angular momentum of the rotor and the angular velocity of precession. Thus, for a given torque, the precession rate varies inversely with the angular momentum of the rotor, which momentum is composed of the rotor moment of inertia and the rotor angular velocity. That is to say, the rate of precession may be increased by decreasing the spin speed.

In cases where the gyro pilot is used as an assist pilot locally or for radio control remotely, means may be employed to apply suitable torques to the spin axis to cause precession about a selected axis. I have shown and described such a system in my copending application Serial No. 636,238, filed December 20, 1945, now Patent No. 2,513,120, in which solenoid means produce the necessary precessing torques.

In systems in which the solenoid current is controlled by simply switching on and off the current thereto, the full torque is suddenly applied and removed from the gyroscope with a corresponding fixed precession rate. Depending on the flight characteristics of the particular aircraft concerned, there is an optimum precession rate for good control. It is desirable, therefore that simple means be provided for adjusting the precession rate of the gyroscope in accordance with these characteristics.

It is an object of this invention, therefore, to provide, in a maneuverable gyroscope, simple adjustable means for controlling the precession rate resulting from the application of constant precessing torques on the spin-axis.

According to the present invention, this object is attained by speed control of the rotor-driving motor.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

In the drawings which are diagrammatic:

Figure 1:
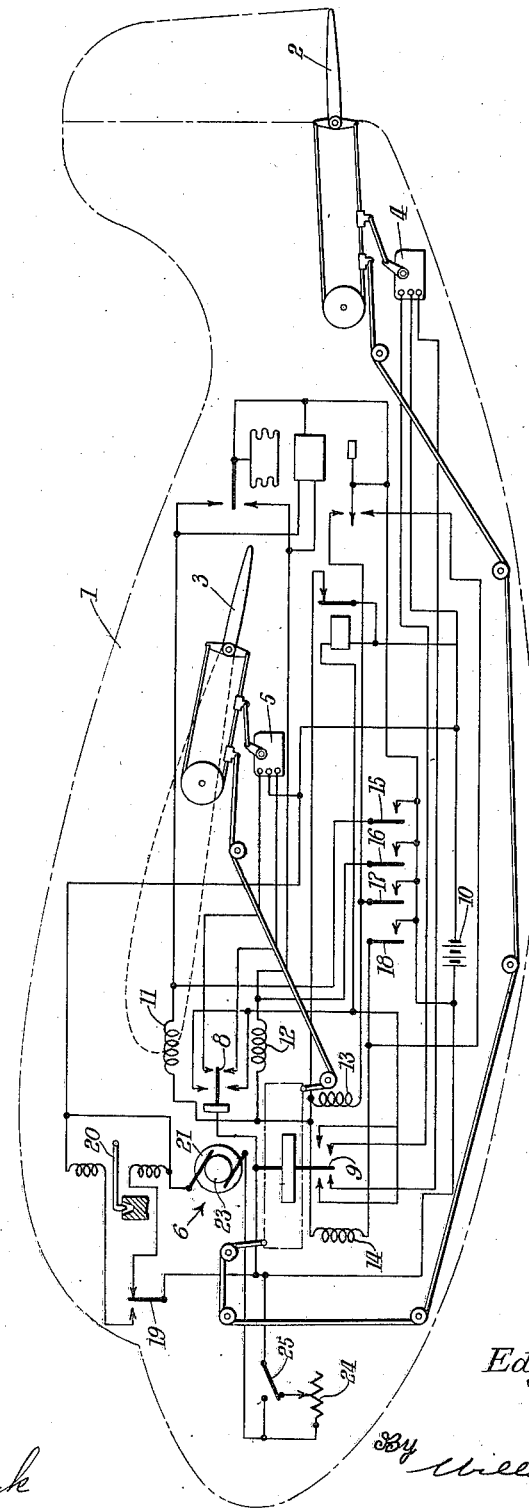
Fig. 1 is a schematic view illustrating the general application of a preferred form of the invention to an aircraft, shown in dotted outline.

Referring to Fig. 1, an aircraft 1 is equipped with an elevator 2 for controlling movement about the pitch axis and with ailerons 3 for controlling movements about the axes of roll and yaw. Operation of the elevator 2 is controlled by a servo-motor 4 and operation of ailerons 3 is controlled by a servo-motor 5 through the single governing agency of a gyro-pilot instrument 6, as set forth and described in my copending application hereinbefore noted and to which reference may be had for a more detailed description of the general construction and operation thereof.

Figure 2:
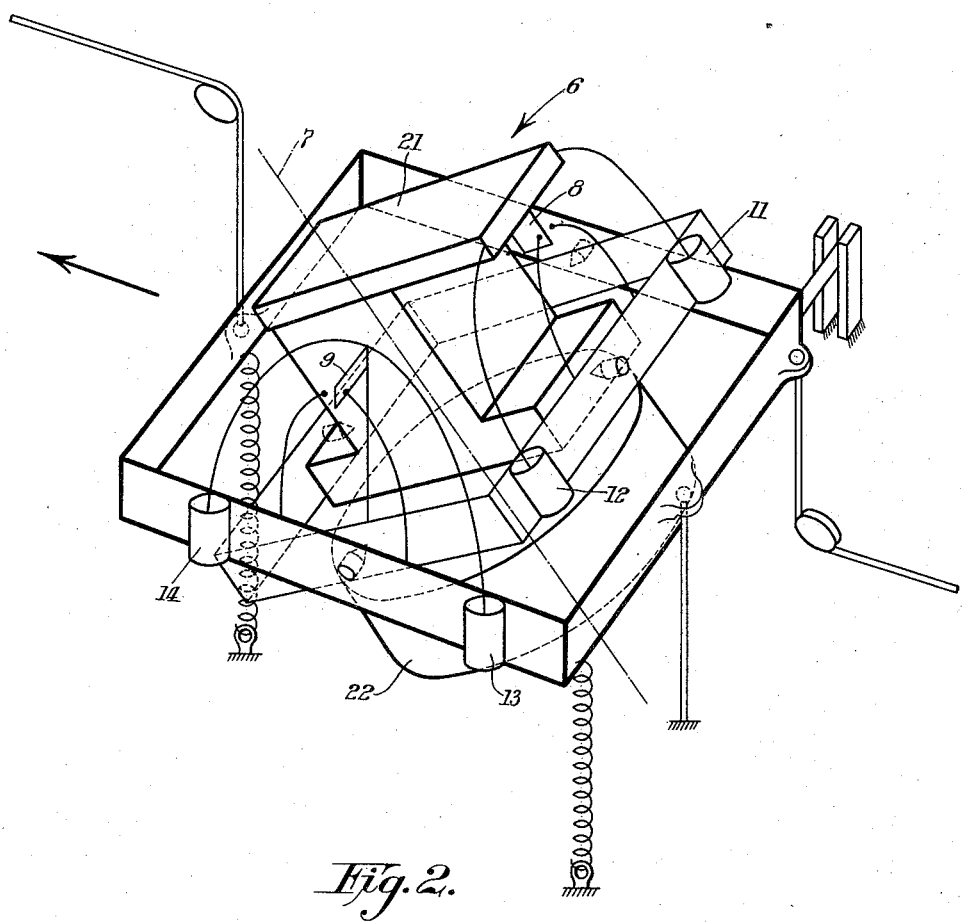
Fig. 2 is a schematic perspective view illustrating the pilot instrument employed.

The gyro-pilot instrument 6 has a single, freely mounted spin-axis 7 inclined to the three axes of angular movement of the aircraft so as to be sensitive to movement of the craft about all three axes. This relation is best seen in Fig. 2, wherein the heavy arrow indicates the direction of flight.

Electrical pick-off devices 8 and 9 operate responsive to deviation of the craft from the course set by the spin-axis to close the proper circuits between the battery 10 and the servo-motor 4 or 5 to selectively operate either the elevator or the ailerons to restore the set course.

In order to change course at the will of the operator, the solenoids 11, 12, 13 and 14 are provided for applying torques to the spin-axis in order to precess it to a new position in space corresponding to the new course selected. Manually operable switches 15, 16, 17 and 18 may be operated selectively to energize the solenoids from the battery 10 in accordance with the desired change.

A caging switch 19 may be operated, if desired, to actuate a caging device 20 which restores the spin-axis to its normal position and locks it there. A motor 21, preferably of the permanent magnet field type having constant speed characteristics, is employed to drive the gyro rotor 22. This motor is preferably of the direct current type and has an armature 23 connected to the battery 10 in series with an adjustable resistor 24. A single-pole double-throw switch 25 is connected so that the resistor 24 may be selectively by-passed by the current from the battery 10 to the armature 23. With this arrangement, it is seen that the switch 25 may be manipulated to insert or cut out the resistor 24 to select a different speed for the rotor 22, thus altering the precession rate of the spin-axis imposed by the constant torque applied by the solenoids. Further, desired intermediate motor speeds may be obtained by proper adjustment of the resistor 24. As a result of these simple changes in the rotor speeds, the precession rate about all axes may be changed to any desired value, and thus the pilot system may be readily adapted to aircraft having widely different flight characteristics without requiring redesign of the solenoids or their related circuits.

Having thus set forth the nature of the invention, what I claim herein is:

1. In a system for controlling the flight of an aircraft, a flight controlling gyroscope having a shiftable spin axis, on and off constant torque means for precessing said spin axis, and means for varying the velocity of spin to vary the preession rate.

2. In a system for controlling the flight of an aircraft, a flight controlling maneuverable gyroscope having a rotor, means for driving said rotor at any one of several speeds, on and off constant torque means for precessing said rotor, and means for selecting any one of said rotor speeds whereby to provide a selected rate of precession.

3. In a system for controlling the flight of an aircraft, a flight controlling gyroscope having a universally mounted rotor, means for driving said rotor, constant torque-applying means for selectively precessing said rotor in any desired direction, and means for selectively controlling said rotor-driving means to change the speed of said rotor whereby to change the rate of precession.

4. In a system for controlling the flight of an aircraft, a flight controlling gyroscope equipped with a rotor having a spin axis, driving means for rotating said rotor about the spin axis, means to apply a torque athwartwise of said spin axis to process said rotor to change the position of said spin-axis in space, and means to vary the speed of said rotor-driving means whereby to vary the rate of said precession.

EDGAR P. TURNER.

REFERENCES CITED

The following references are of record in the file of this patent:

UNITED STATES PATENTS

| Number | Name | Date |
|---|---|---|
| 1,986,807 | Gillmor | Jan. 8, 1935 |
| 2,161,241 | Bates | June 6, 1939 |
| 2,459,495 | Brown | Jan. 18, 1949 |

FOREIGN PATENTS

| Number | Country | Date |
|---|---|---|
| 585,697 | Germany | Feb. 22, 1934 |
| 365,189 | Great Britain | Dec. 19, 1931 |